United States Patent
Doerner

(10) Patent No.: US 10,606,749 B2
(45) Date of Patent: *Mar. 31, 2020

(54) ADAPTIVE STORAGE MANAGEMENT FOR OPTIMIZING MULTI-TIER DATA STORAGE SYSTEM

(71) Applicant: Quantum Corporation, San Jose, CA (US)

(72) Inventor: Don Doerner, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/943,883

(22) Filed: Apr. 3, 2018

(65) Prior Publication Data
US 2018/0225202 A1 Aug. 9, 2018

Related U.S. Application Data

(63) Continuation of application No. 14/841,788, filed on Sep. 1, 2015, now Pat. No. 9,965,389.

(51) Int. Cl.
*G06F 12/0804* (2016.01)
*G06F 12/0891* (2016.01)
*G06F 12/121* (2016.01)

(52) U.S. Cl.
CPC ...... *G06F 12/0804* (2013.01); *G06F 12/0891* (2013.01); *G06F 12/121* (2013.01); *G06F 2212/1044* (2013.01); *G06F 2212/604* (2013.01)

(58) Field of Classification Search
CPC .................................................. G06F 3/0647
See application file for complete search history.

(56) References Cited

U.S. PATENT DOCUMENTS 8,954,381 B1 2/2015 Naamad
9,703,664 B1 7/2017 Alshawabkeh et al.
(Continued)

OTHER PUBLICATIONS

MacMillan Dictionary, "Credible—definition and synonyms." The reference was included by the Examiner in the Final Office Action dated Aug. 10, 2017 from U.S. Appl. No. 14/841,788. The date of publication is unknown.
(Continued)

*Primary Examiner* — Edward J Dudek, Jr.
(74) *Attorney, Agent, or Firm* — Eschweiler & Potashnik, LLC

(57) ABSTRACT

Embodiments provide adaptive storage management for optimizing multi-tier data storage. A storage manager may interact with storage decision advisors. The manager may adaptively make storage management decisions (e.g., flush, evict, recall, delete) after considering recommendations from and the credibility of the storage decision advisors. The manager may update the credibility of storage decision advisors based on how their recommendations affected optimization. The manager may adaptively choose when to rebalance or reconfigure the credibility of the storage decision advisors. Storage decision advisors may themselves be adaptive. Storage decision advisors may examine credibility feedback from the storage manager to determine which recommendations were useful and which were not. Storage decision advisors may then change when they will make a recommendation, when they will abstain from making a recommendation, the type of recommendation provided, or other behavior. Optimization may concern performance, cost, power usage, or other factors.

15 Claims, 7 Drawing Sheets

(56) References Cited

U.S. PATENT DOCUMENTS

| | | | |
|---|---|---|---|
| 9,965,389 B2* | 5/2018 | Doerner | G06F 12/0804 |
| 2006/0248165 A1 | 11/2006 | Sridhar et al. | |
| 2011/0138299 A1 | 6/2011 | Pugsley et al. | |

OTHER PUBLICATIONS

Non-Final Office Action dated Mar. 24, 2017 for U.S. Appl. No. 14/841,788.
Final Office Action dated Aug. 10, 2017 for U.S. Appl. No. 14/841,788.
Notice of Allowance dated Jan. 10, 2018 for U.S. Appl. No. 14/841,788.

* cited by examiner

ADAPTIVE STORAGE MANAGEMENT FOR OPTIMIZING MULTI-TIER DATA STORAGE SYSTEM

REFERENCE TO RELATED APPLICATION

This Application is a Continuation of U.S. application Ser. No. 14/841,788 filed on Sep. 1, 2015, the contents of which are hereby incorporated by reference in their entirety.

BACKGROUND

A data storage system may have multiple tiers of storage in which data may be stored. For example, a data storage system may have battery-backed random access memory (RAM), flash storage, disk storage, tape storage, cloud-based storage, and other storage. The different types of storage may have different properties. For example, different types of storage may have different retrieval capacities, different speeds, different costs, different energy requirements, or other properties. Conventionally, a data storage system may have organized the different types of storage available into tiers based on the properties. For example, a smaller, faster yet more expensive cache may have been made from RAM while a larger slower but less expensive long term repository may have been made from tape storage. Flash memory and disk storage may have been organized into intermediate tiers. Conventionally it may have been difficult, if even possible at all, to optimize data storage in a multi-tier system.

A location from which data can be read most quickly may be employed as a cache. A "cache" may be thought of as storing a quickly available "working copy" of data that when not in use may be stored somewhere else (e.g., in a slower, higher capacity, lower cost tier). Conventionally, optimizing data storage in a multi-tier storage system may have sought to increase a cache hit rate or cache utilization while providing an overall acceptable quality of service with respect to retrieval time and cost. Conventionally, optimizing data storage in a multi-tier system may have sought to place certain types of content (e.g., most frequently used, most time sensitive) in a certain type of storage (e.g., cache, fastest) and may have sought to optimize movement of data between different types of storage (e.g., from largest/slowest to fastest). The effectiveness of optimization may have been determined by the timing and quality of decisions concerning when to copy data between tiers.

Optimizing data storage in a multi-tier storage system may involve making good decisions about whether and when to move data between tiers. For example, optimizing multi-tier storage may involve making decisions about when to flush data, when to evict data, when to recall data, or when to delete data. Flushing data may refer to copying data from one tier (e.g., smaller/faster/more expensive) to another tier (e.g., larger/slower/less expensive). Evicting data may refer to removing data from a tier (e.g., smaller/faster/more expensive). Recalling data may refer to copying data from one tier (e.g., larger/slower/less expensive) to another tier (e.g., smaller/faster/more expensive). Deleting data may refer to removing data from a tier (e.g., larger/slower/less expensive) or data storage system completely. When a data storage system includes a "cache" tier that is the smallest and fastest, flushing data may refer to copying data from the cache to another tier (e.g., larger/slower/less expensive), evicting data may refer to removing data from the cache, recalling data may refer to copying data to the cache, and deleting data may refer to removing data from a non-cache tier.

Conventionally, optimizing multi-tier storage may have included programming policy decisions or rules that controlled whether, when, and how to move data. This type of conventional multi-tier storage optimization may have been challenged by the fact that an optimization for one entity (e.g., user, application, organization) or collection of entities may not have been an optimization for another entity or collection of entities. Additionally, this type of conventional multi-tier storage may have been challenged by the fact that a workload for an entity or collection of entities may change over time and thus an optimization for one point in time may not be an optimization for a different point in time.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods provide adaptive storage management for optimizing a multi-tier data storage system. A storage manager may interact with a set of storage decision advisors to determine how to handle storage management decisions. The storage manager may adaptively make storage management decisions (e.g., flush, evict, recall, delete) after considering the recommendations and credibility of members of the set of storage decision advisors. The storage manager may update the credibility of members of the set of storage decision advisors based on whether their recommendations were useful. The storage manager may adaptively choose when to rebalance or reconfigure the credibility of members of the set of the storage decision advisors.

In one embodiment, a storage decision advisor may itself be adaptive. A storage decision advisor may examine credibility feedback from the storage manager to determine which recommendations it made were useful and which were not. The storage decision advisor may then change when it will make a recommendation, when it will abstain from making a recommendation, the type of recommendations it provides, or other factors. In one embodiment, some members of the set of storage decision advisors may be self-aware and adaptive, while others may not.

Figure 1:
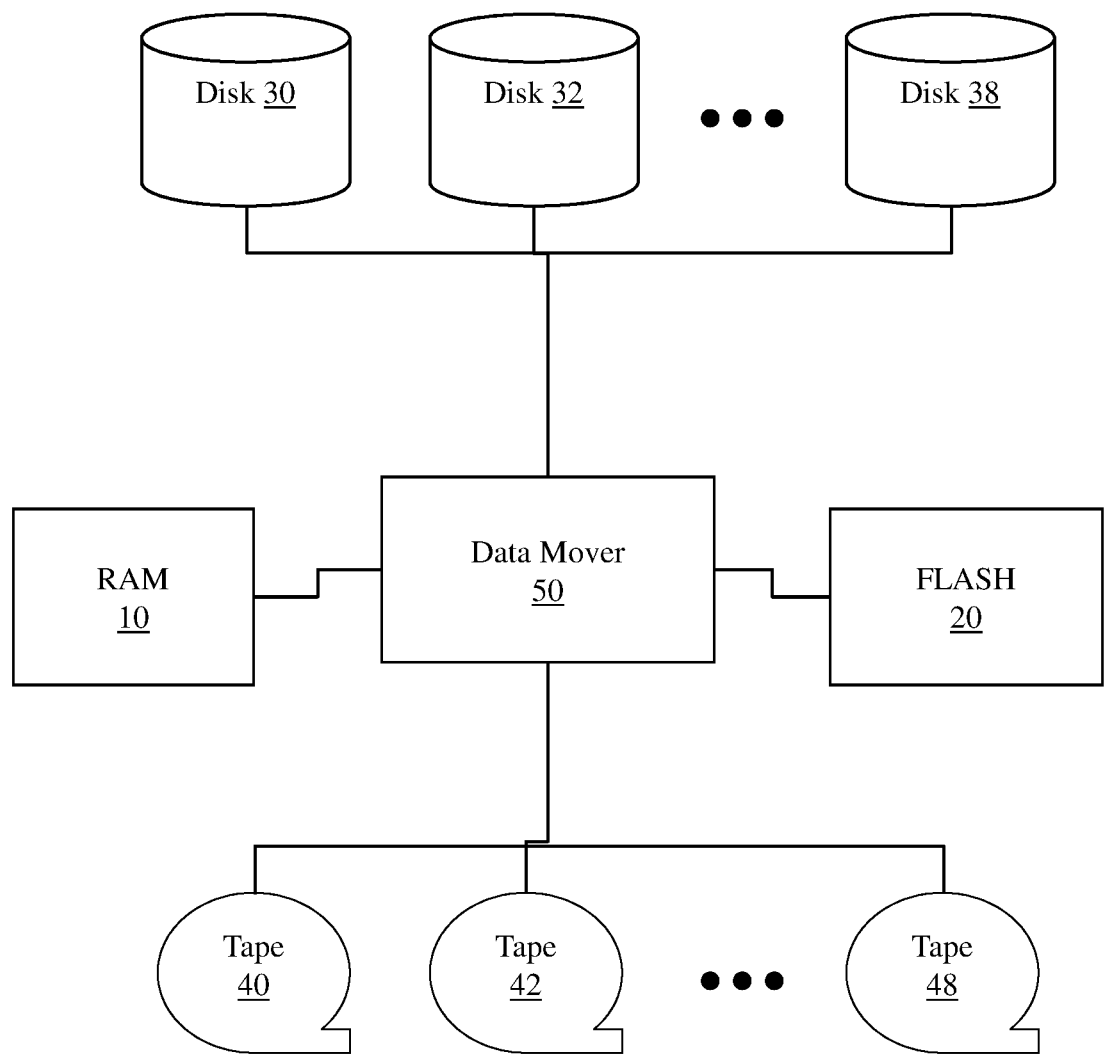
FIG. 1 illustrates an example multi-tier data storage system.

FIG. 1 illustrates an example multi-tier data storage system. A data mover 50 may be configured to move data between different tiers of storage including RAM 10, FLASH 20, disks 30, 32 . . . 38, and tape drives 40, 42 . . . 48. While FIG. 1 illustrates all the tiers being connected to the data mover 50 and no connections between the tiers, an example multi-tier data storage system may have direct connections between tiers. For example, there may be a direct connection between RAM 10 and FLASH 20 or between other tiers. Thus, data may flow through data mover 50 when moving between tiers or may flow directly between tiers under the control of data mover 50.

Figure 2:
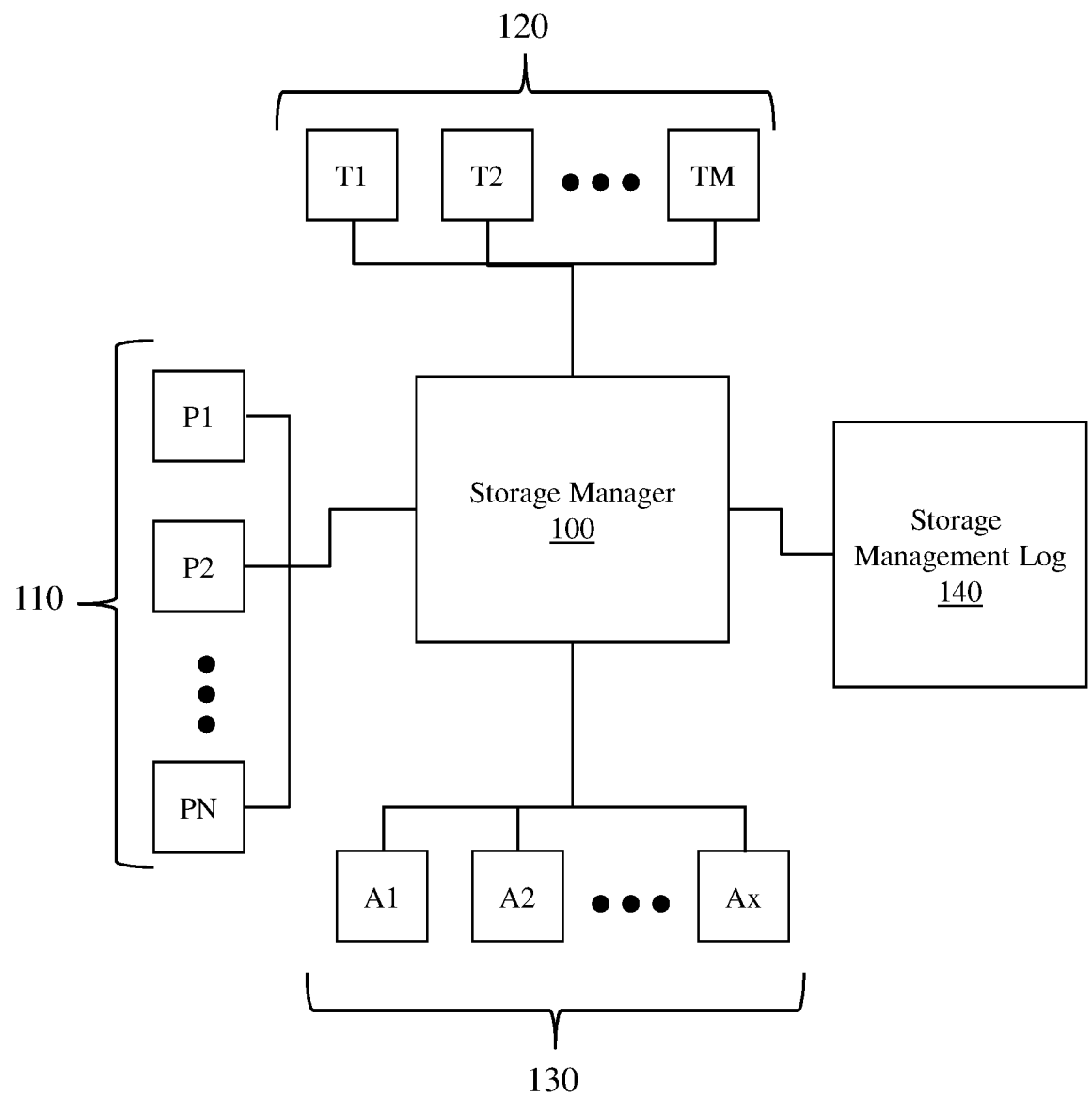
FIG. 2 illustrates an example storage manager associated with adaptive storage management for optimizing a multi-tier data storage system.

FIG. 2 illustrates a storage manager 100 interacting with a number of processes 110, a number of storage tiers 120, a number of advisors 130, and a storage management log 140. Storage manager 100 is tasked with managing, improving, or optimizing the performance of a multi-tier data storage system that includes devices in the tiers 120. Devices in the tiers 120 may include RAM, FLASH, disk, tape, solid state drives (SSD), cloud-based storage devices, or other devices. Optimizing the performance of the multi-tier data storage system involves having the right data in the right location at the right time. The "right" data may be determined by factors including which data is about to be accessed, which data is accessed most frequently, data for which the shortest possible read delay is required, or other factors. The "right" location may be determined by, for example, read time, write time, read cost, write cost, read energy expenditure, write energy expenditure, or other considerations. The "right" time may be determined by, for example, having data available on demand, having data available within a pre-defined period of time, or other factors.

Data storage management optimization is an actual problem, not a theoretical problem, because processes 110 have storage management needs. For example, the processes 110 may need to store data and may need to access stored data. This type of data management can only be performed by and for a computer because actual physical devices are controlled by computer-generated electronic signals to transfer electronic data from device to device. The data may be stored in different locations in the storage tiers 120. Different locations in the storage tiers may have different read or write performance parameters. For example, it may be faster to read data from RAM because only a bus communication is needed while it may be slower to read data from a cloud-based device because a network communication is required. Different locations may also have different energy consumption requirements. For example, a first amount of energy may be required to read data from a disk while a second amount of energy may be required to read data from a tape. Different locations may also have different costs. For example, storing data on a disk drive may cost a first amount while storing data on a cloud-based device may cost a second amount. Thus, the optimization problem may have several parameters to consider. In one embodiment, optimization only concerns read access time. In another embodiment, optimization may concern cache hit rates or cache utilization. In another embodiment, optimization may concern read access time, cache hit rates, dollar cost, and energy performance. Different embodiments may have different combinations of factors upon which optimization is based.

When a process has a storage management requirement or request, the storage manager 100 may make a decision about how to handle the requirement or request. The decision may be based, at least in part, on recommendations provided by members of the advisors 130. The decision may involve deciding when or whether to flush, evict, recall, delete or otherwise process data in the different available locations in the tiers 120.

One or more members of the advisors 130 may make recommendations about when or whether to flush, evict, recall, delete or otherwise process data in different locations in the tiers 120. When the storage manager 100 presents a storage management decision for consideration to the advisors 130, an advisor may make a recommendation or may abstain from making a recommendation. The storage manager 100 may then consider recommendations received from the advisors 130.

Different members of the advisors 130 may have different credibility levels that have developed over time based on the value, worth, efficacy, utility, or other measures of their recommendations to the storage manager 100. Thus, the storage manager 100 may consider the credibility level of an advisor when deciding whether to act on the recommendation. The credibility levels may differ because different advisors may take different approaches to storage management. For example, different advisors may employ least recently used (LRU) reasoning, least frequently used (LFU) reasoning, large item eviction reasoning, small item eviction reasoning, space continuity reasoning, weighted benefit analysis reasoning, or other approaches when making recommendations. A weighted benefit analysis may consider how often an item is used and the expense of moving the item. Different advisors may also make different types of recommendations. For example, an advisor may recommend evicting some data to make room for other data, predictively recalling data in advance of a perceived need, recalling data in response to an actual need, moving data between tiers for non-demand reasons (e.g., load balancing), or some other recommendation.

Ultimately the storage manager 100 makes a decision about what to do in response to the data storage requirement or request from a member of the processes 110. Thus, the storage manager 100 enacts storage management decisions (e.g., flush, evict, recall, delete). The storage manager 100 logs storage management decisions in the storage management log 140.

The storage management log 140 records recommendations made by the advisors 130. The storage management log 140 also records decisions that were made by the storage manager 100, actions that were needed to satisfy storage management requirements for the processes 110, and the actual results of decisions made by the storage manager 100 to support the processes 110. The results may include, for example, a cache hit rate, a change in cache hit rate, a dollar cost to move data, an energy cost to move data, a response time for responding to a data request, or other information. Cache hit rates may provide insights into whether data is being moved to and from locations in a useful manner. For example, a high cache hit rate may indicate that good data movement decisions are being made while a low cache hit rate may indicate that sub-optimal data movement decisions are being made. When response time is a primary consideration for optimization, cache hit rate may be a primary factor for determining optimization levels.

The storage manager 100 may update the credibility of an advisor based on the action taken and the results of that action. In one embodiment, members of the advisors 130 may themselves be self-aware and adaptive. For example, an advisor may examine updates to their credibility and identify when it is making a good recommendation and when it is making a bad recommendation. An advisor can then learn when to make a recommendation and when to abstain. For example, an advisor may determine that when it makes a recommendation about a certain directory its recommendation is useful and therefore it will continue to make those types of recommendations. However, an advisor may determine that when it makes a recommendation about another directory that its recommendation would have been or was sub-optimal and therefore it may stop making those types of recommendations. An advisor may learn whether eviction recommendations are helpful or harmful and may adjust the number and frequency of eviction recommendations accordingly. An advisor may learn whether recall recommendations are helpful or harmful and may adjust the number and frequency of recall recommendations accordingly. An advisor may learn other information about types, targets, or timing of recommendations and adjust its performance accordingly.

The storage manager 100 may periodically or otherwise manipulate (e.g., reduce, increase, cut in half) the credibility of members of the advisors 130. The period between manipulations may be based on an amount of time, a number of actions performed by the storage manager 100, an amount of data moved by the storage manager 100, or other criteria. The period between manipulations may be adaptive based on, for example, whether or how a cache hit rate is changing. After the manipulation, the relative credibility of members of the advisors 130 may remain intact, but the impact of subsequent increases or reductions of credibility may be greater or less. The cache hit rate may provide valuable insight into the performance of a data storage manager. When a significant number of data requests can be satisfied from a cache tier (e.g., RAM), then response time may be optimized. However, cache hit rate may not be the only measure of performance or optimization. For example, the cache hit rate or other parameters may be evaluated in light of the size of the cache. The size may be an actual size or a derived size that considers factors like the actual amount of space in a cache, the amount of free space available in a cache, the rate at which the cache is being used (e.g., ingress rate, egress rate), or other factors.

The storage manager 100 may periodically or otherwise determine an interval of interest for which the storage manager 100 will evaluate the value, efficacy, utility, or other measure of recommendations made by members of the advisors 130. The interval of interest may be based on factors including, for example, an amount of time, a number of transactions handled by the storage manager 100, an amount of memory moved in the tiers 120, or other criteria.

The storage manager 100 may then increase the credibility of advisors whose recommendations were valuable or effective and may decrease the credibility of advisors whose recommendations were not valuable or effective. In one embodiment, the credibility may be manipulated on a recommendation by recommendation basis. In one embodiment, the amount by which the credibility is increased or decreased may be constant for each recommendation or may vary based on how good or how bad a recommendation was. In one embodiment, the storage manager 100 may not manipulate the credibility of an advisor that abstained from a decision. The determination of whether the recommendation was valuable or effective may be based on whether the recommendations improved an optimization measure. The optimization measure may be based on factors including, for example, read performance, cache hit rate, cost, or energy usage.

In one embodiment, the storage manager 100 may have policies that control, at least in part, which recommendations may be considered. For example, during a first time interval (e.g., working hours, historical high load times) the storage manager 100 may consider recommendations from a first subset of the advisors 130 while during a second time interval (e.g., off hours, historical low load times) the storage manager 100 may consider recommendations from a second subset of the advisors 130. In one embodiment, the subsets may be user configurable or may be self-adapting by the storage manager 100.

Figure 3:
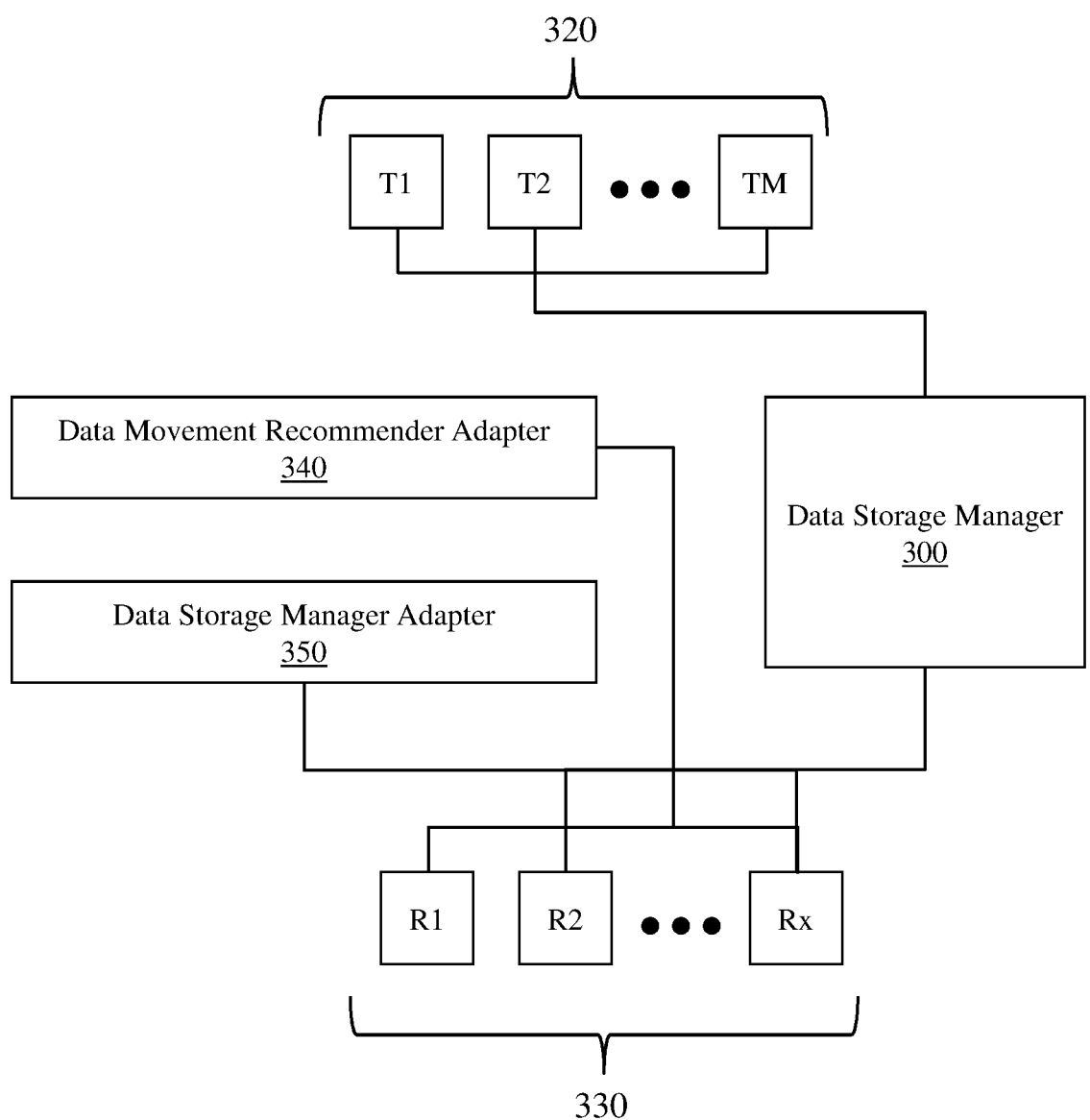
FIG. 3 illustrates an example management system for a multi-tier electronic data storage system.

FIG. 3 illustrates an example management system for a multi-tier electronic data storage system 320. The management system includes a computerized data storage manager 300 that performs several different actions. In one example work flow, manager 300 accesses a data storage transaction to be serviced by a device in a plurality of storage devices arranged in the multi-tier electronic data storage system 320. The data storage transaction may be an actual transaction or predicted transaction. Handling the transaction may involve moving data in the multi-tier electronic data storage system 320 or may involve realizing that suitable data is already located in appropriate locations and thus no action is required. The manager 300 may seek recommendations about how, whether, or when to move data in the multi-tier electronic data storage system 320. Thus, manager 300 may selectively provide information about the data storage transaction to a member or members of a plurality of data movement recommenders 330. The plurality 330 may include, for example, recommenders R1 and R2 . . . Rx. The recommenders 330 are computer processes, circuits, firmware, or other computerized entities. The recommenders 330 are not humans or mental processes. The manager 300 may decide to not provide information about a data storage transaction when the manager 300 already has good intelligence about an appropriate response to the request. For example, a series of read requests for the same data may cause the manager 300 to seek recommendations for early members of the series but not for later members once acceptable or optimal performance has been achieved.

Manager 300 selectively performs a data movement action for a member of the plurality of storage devices in the storage system 320. The data movement action may be, for example, an evict action, a flush action, a recall action, or a delete action. Which data movement action is taken may be based, at least in part, on a data movement recommendation received from a member of the plurality of data movement recommenders 330 and a credibility of the member of the plurality of data movement recommenders 330 associated with the data movement recommendation. For example, a first recommender may recommend flushing data from a certain location while a second recommender may recommend deleting data from one location and recalling data from another location. The manager 300 may decide which action to take based on the credibility of the various recommenders. For example, if the first recommender has a credibility that exceeds a threshold while the second recommender has a credibility that is below the threshold, then the recommendation from the first recommender may be acted on. In one embodiment, the manager 300 may seek a quorum of similar recommendations that all come from recommenders above a credibility threshold. When no suitable or acceptable recommendation is available, the manager 300 may act in a pre-determined way.

When a data movement action is taken, the manager 300 determines an impact of the data movement action on the multi-tier electronic data storage system 320. In one embodiment, the impact of the data movement action is a projected impact rather than an actual impact. In this way, various possible approaches may be evaluated before actually moving data. The impact of the data movement action can be evaluated in different ways. In one embodiment, the impact of the data movement action is measured by an effect on a cache hit rate for the multi-tier electronic data storage system 320. Measuring the effect on a cache hit rate may provide information about how well a certain tier (e.g., cache) is being used in the multi-tier electronic data storage system 320. In another embodiment, the impact of the data movement action is measured by an effect on a response time for satisfying the data storage transaction. Measuring the response time may provide information about the performance of the data storage system 320. Other measurements used for determining the impact may include a time for performing the data movement action, a dollar cost for performing the data movement action, or an energy cost associated with performing the data movement action. In one embodiment, a user may define the way in which the impact of the data movement is evaluated using a weighted sum of various factors.

The manager 300 may store data relating the data movement action, the impact of the data movement action, and the data movement recommendation. This data may be consulted at a later point in time to determine whether and how to manipulate the credibility of recommenders that made recommendations. The manager 300 may store the data in a log, a file, a memory, or other location. Not all recommenders may make recommendations. Some recommenders may abstain from making a recommendation.

The system also includes a computerized data movement recommender adapter 340. Adapter 340 selectively manipulates the credibility of the member of the plurality of data movement recommenders 330 associated with the data movement recommendation. The manipulation may occur contemporaneously with the data movement, soon in time after the data movement is made, or may be made at a later point in time using the data that was stored relating the data movement action, the impact of the data movement action, and the recommendation. The manipulation may be based, at least in part, on the impact of the data movement action. The computerized data movement recommender adapter 340 may manipulate the credibility of a member of the plurality of data movement recommenders at different times for different reasons. In one embodiment, the adapter 340 may manipulate the credibility on a recommendation-by-recommendation basis. The manipulation may be done in real-time as recommendations are made and data movements are taken, or may be done off-line at a later point in time. For example, the adapter 340 may manipulate the credibility after a threshold number of data movement recommendations have been provided by the member of the plurality of data movement recommenders. Manipulating the credibility may include enhancing the credibility of the recommender when the impact of the recommendation was positive or diminishing the credibility of the recommender when the impact of the recommendation was negative.

The adapter 340 may change the criteria upon which it decides to selectively manipulate the credibility of a recommender. The criteria may be changed in response to, for example, a change in a cache hit rate for the multi-tier electronic data storage system 320, a change in a response time for the multi-tier electronic data storage system 320, a change in a dollar cost for operating the multi-tier electronic data storage system 320, a change in an energy cost for operating the multi-tier electronic data storage system 320, or a change in another parameter. In one embodiment, the criteria may be user configurable and may include a weighted sum of different parameters. In one embodiment, the criteria may be responsive to a time of day or operating condition. For example, during times of heavy loads the criteria may focus on cache hit rate or response time while during times of lower loads the criteria may focus on reducing dollar or energy costs.

The system also includes a computerized data storage manager adapter 350 that selectively collectively manipulates the credibility of members of the data movement recommenders 330. The collective credibility may be manipulated at times determined, at least in part, on a number of data movement actions performed by the computerized data storage manager 300, on an amount of data moved by the computerized data storage manager 300, on a time period, on a cache hit rate for the multi-tier electronic data storage system 320 falling below a threshold, or a response time for the multi-tier electronic data storage system 320 exceeding a threshold. In one embodiment, the computerized data storage manager adapter 350 selectively collectively reduces the credibility of the members of the data movement recommenders 330 by an equal percentage. For example, the credibility of members of the plurality of data movement recommenders 330 may be cut in half.

In one embodiment, the adapter 350 changes the criteria upon which it decides to manipulate the credibility of the plurality of data movement recommenders 330. The criteria may be changed to make the system more responsive to current conditions. The criteria may be changed based, at least in part, on a change in a cache hit rate for the multi-tier electronic data storage system 320, on a change in a response time for the multi-tier electronic data storage system 320, on a change in a dollar cost for operating the multi-tier electronic data storage system 320, on a change in an energy cost for operating the multi-tier electronic data storage system 320, or for other reasons.

Figure 4:
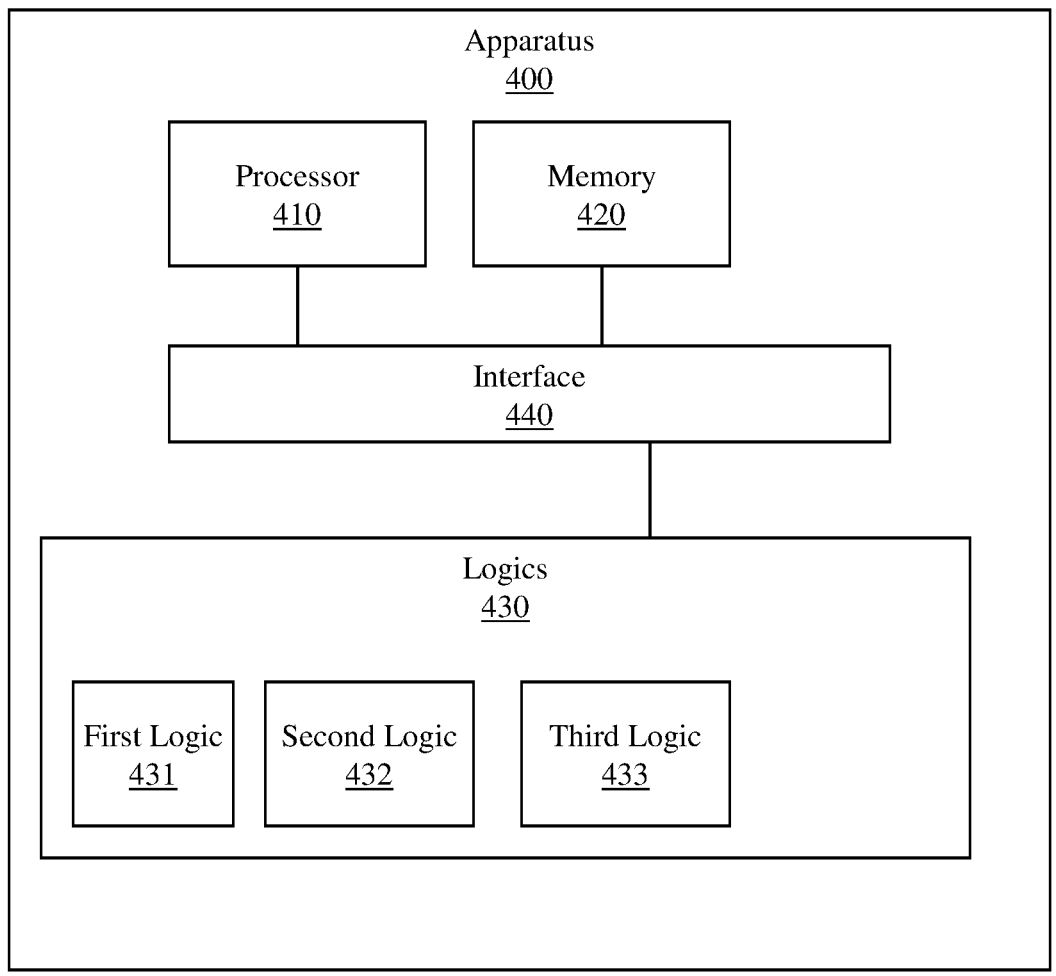
FIG. 4 illustrates an example apparatus associated with adaptive storage management for optimizing a multi-tier data storage system.

FIG. 4 illustrates an apparatus 400 that provides adaptive storage management for a multi-tier electronic data storage system. Apparatus 400 includes a processor 410, a memory 420, and a set 430 of logics that is connected to the processor 410 and memory 420 by a computer hardware interface 440. In one embodiment, processor 410 and the set of logics 430 optimize performance of the multi-tier data storage management system. In different embodiments, the performance may be optimized on factors including response time, cache hit rate, dollar cost, or energy cost. Memory 420 may store information about actual or predicted data storage requests or requirements, recommendations about how to respond to the requests or requirements, credibility data for the advisors that make recommendations, the impact of a decision on utility or another measure, a decision made in response to a request, requirement, or recommendation, or other data.

In one embodiment, the functionality associated with the set of logics 430 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 430 are implemented as ASICs or SOCs. In one embodiment, the first logic 431, the second logic 432, or the third logic 433 may be ASICs, FPGA, or other integrated circuits.

The set 430 of logics includes a first logic 431 that receives a data storage request to be handled by a multi-tier data storage system. The multi-tier data storage system includes at least two tiers. The at least two tiers may include different types of data storage apparatus. For example, the different tiers may include a random access memory (RAM) apparatus, a flash memory apparatus, a solid state disk (SSD) apparatus, a disk apparatus, a tape apparatus, a cloud-based storage apparatus, or other apparatus. One tier may include a cache.

The first logic 431 provides information about the data storage request to an advisor in a plurality of advisors. An advisor may make a recommendation about the data storage request or may abstain from making a recommendation. The first logic 431 may receive a recommendation from an advisor concerning whether, when, or how to move data in the multi-tier data storage system in response to the data storage request. The recommendation may be, for example, a flush recommendation, an evict recommendation, a recall recommendation, or a delete recommendation. The first logic 431 may heed the recommendation or may ignore the recommendation. To satisfy the data storage request, the first logic 431 may decide to perform a data movement in the multi-tier data storage system or may decide to leave data where it is. In one embodiment, when there is an acceptable data movement recommendation, the first logic 431 selectively performs a data movement in the multi-tier data storage system based, at least in part, on the data storage request, the acceptable recommendation, and a weighting factor associated with the advisor. When the data movement is performed based on the advice in a recommendation, the first logic 431 may log information about the data storage request, the recommendation from the advisor, and the data movement. Logging the information facilitates performing retrospective analysis of recommendations and their impacts, which in turn facilitates updating the credibility of various recommenders. Rather than rely on a single recommendation, in one embodiment, the first logic 431 selectively performs the data movement based, at least in part, on a threshold level of agreement between recommendations from two or more advisors in the plurality of advisors.

The first logic 431 may consider recommendations from different subsets of the plurality of advisors based on a user-configurable policy. The policy may identify different advisors to use under different conditions. For example, a first subset of advisors may be consulted during certain times of day, under certain loads, or under other conditions while a second subset of advisors may be consulted at other times. For example, when the system is near capacity and under a heavy load, advisors that have shown proficiency for optimizing cache hit rate and response time may be consulted. But when the system has excess capacity and is under a light load, advisors that have shown proficiency at optimizing operating costs or energy requirements may be consulted.

The apparatus 400 also includes a second logic 432 that selectively determines an effect of the data movement on an optimization measure of the multi-tier data storage system during an interval of interest. The interval of interest may be based on a time period, a point in time, a number of data movements performed, an amount of data moved in the multi-tier data storage system, or on other criteria. A longer interval of interest may be employed for a mature system with well-established workloads while a shorter interval of interest may be employed for an immature system whose workloads and demands are still being learned. In one embodiment, the second logic 432 may determine the effect of the data movement for every recommendation that is received and acted on. In another embodiment, the second logic 432 may determine the effect of the data movement for every recommendation received. In another embodiment, the second logic 432 determines the effect of the data movement for less than each recommendation received from the plurality of advisors.

In different embodiments, the second logic 432 may determine the effect of the data movement based on different criteria. For example, the second logic 432 may determine the effect based on a cache hit rate in the multi-tier data storage system or on a response time associated with satisfying the data storage request after performing the data movement. Other criteria may be considered. In one embodiment, determining the effect may be based on a user-configurable weighted sum of factors.

The apparatus 400 also includes a third logic 433 that selectively adapts the weighting factor for the advisor upon determining that an update threshold has been met. The update threshold may be based on various factors including, for example, a number of data movements performed by the first logic 431, an amount of time, a point in time, an amount of data moved by the first logic 431, a cache hit rate for the multi-tier data storage system falling below a threshold, or a response time for the multi-tier data storage system exceeding a threshold. Thus, the update threshold may be responsive to time periods, volume of data, or performance.

In one embodiment, the third logic 433 selectively adapts the weighting factor for an advisor based, at least in part, on the effect of the recommendation made by the advisor. For example, if the advisor is making recommendations that have positive impacts, its weighting factor may be manipulated to make it more likely that a recommendation from the advisor will be acted on. But if the advisor is making recommendations that have negative impacts, then its weighting factor may be manipulated to make it less likely that a recommendation from the advisor will be acted on.

In one embodiment, the third logic 433 selectively adapts the weighting factor for an advisor as part of a collective action that manipulates the weighting factor for two or more advisors in the plurality of advisors. For example, the weighting factors for all the advisors may be periodically cut in half, reduced by ten percent, or otherwise manipulated to facilitate making more recent recommendations more relevant in credibility determinations.

Figure 5:
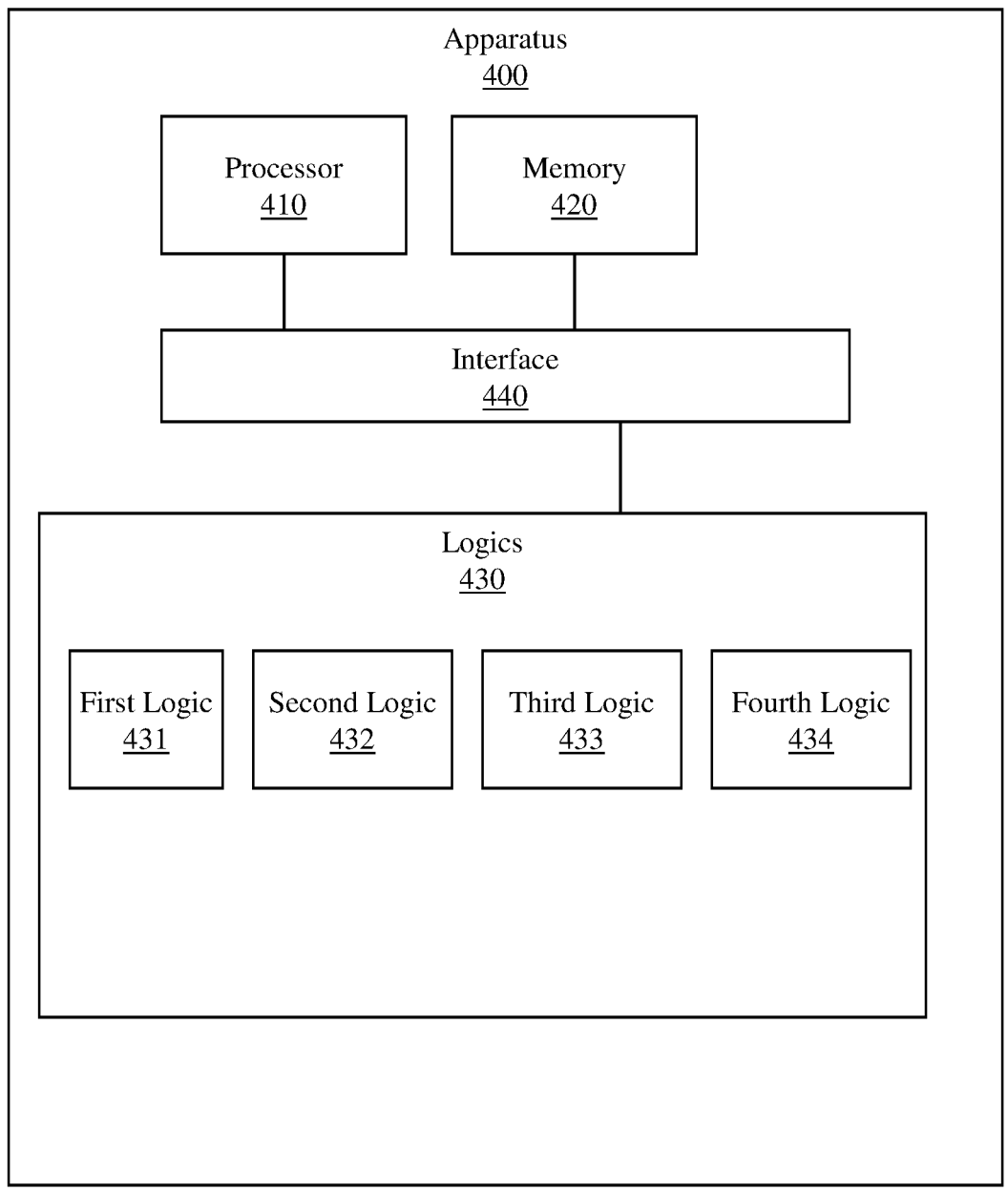
FIG. 5 illustrates an example apparatus associated with adaptive storage management for optimizing a multi-tier data storage system.

FIG. 5 illustrates another embodiment of apparatus 400. This embodiment also includes a fourth logic 434 that selectively adapts an operation of a selected advisor upon determining that an adaptation threshold has been met. The adaptation threshold may be based on various factors. For example, the adaptation threshold may be based on a number of recommendations made by the selected advisor, on the number of recommendations made by the selected advisor that had a positive effect on the optimization measure, on the number of recommendations made by the selected advisor that had a negative effect on the optimization measure, on a ratio of recommendations made by the selected advisor that had a positive effect on the optimization measure versus recommendations that had a negative effect on the optimization measure, or an amount by which a recommendation made by the selected advisor affected the optimization measure. Thus, the operation of the advisor may be adapted based on how well or how poorly the advisor is performing over a period of time.

There are different ways in which the operation of an advisor may be changed. The fourth logic 434 may adapt the operation of a selected advisor by changing the likelihood that the selected advisor will make a recommendation about a portion of a file system stored by the multi-tier data storage system. For example, an advisor may be consistently right about recommendations concerning a particular directory in file system and thus may be encouraged to continue to make recommendations about that directory. The fourth logic 434 may adapt the operation of the selected advisor by changing the likelihood that the selected advisor will make a recommendation concerning a tier in the multi-tier data storage system. For example, an advisor may be consistently wrong about recommendations concerning a cache layer in the multi-tier data storage system and thus may be discouraged from making subsequent recommendations about that tier.

The fourth logic 434 may adapt the operation of the selected advisor by changing the likelihood that the selected advisor will make a recommendation concerning a type of device in the multi-tier data storage system. For example, an advisor may be consistently right about recommendations concerning a disk drive but consistently wrong about recommendations concerning a tape drive. Thus, the advisor may be adapted so that it will continue or even increase making recommendations about the disk drive but will eschew making recommendations about the tape drive.

The fourth logic 434 may adapt the operation of the selected advisor by changing the likelihood that the selected advisor will make a recommendation about flushing data, evicting data, recalling data, or deleting data. For example, an advisor may be consistently right about advising to flush data but consistently wrong about advising to delete data. Thus, the advisor may be adapted so that it will make flush data recommendations but not make delete data recommendations.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Processes present their requirements to a storage manager. The storage manager submits the requirements to the advisors for recommendations. Some advisors make recommendations, some may abstain. The storage manager records the recommendations in the storage management log. The storage manager makes a decision based, at least in part on the recommendations, as weighted by credibility levels. The storage manager records what decision it made, causes the storage management action (e.g., flush, evict, recall, delete) to occur, and records the results of the storage management action. The impact of the storage management action may also be recorded. For example, whether a cache hit ratio increased or decreased may be determined and associated with a recommendation and decision.

Figure 6:
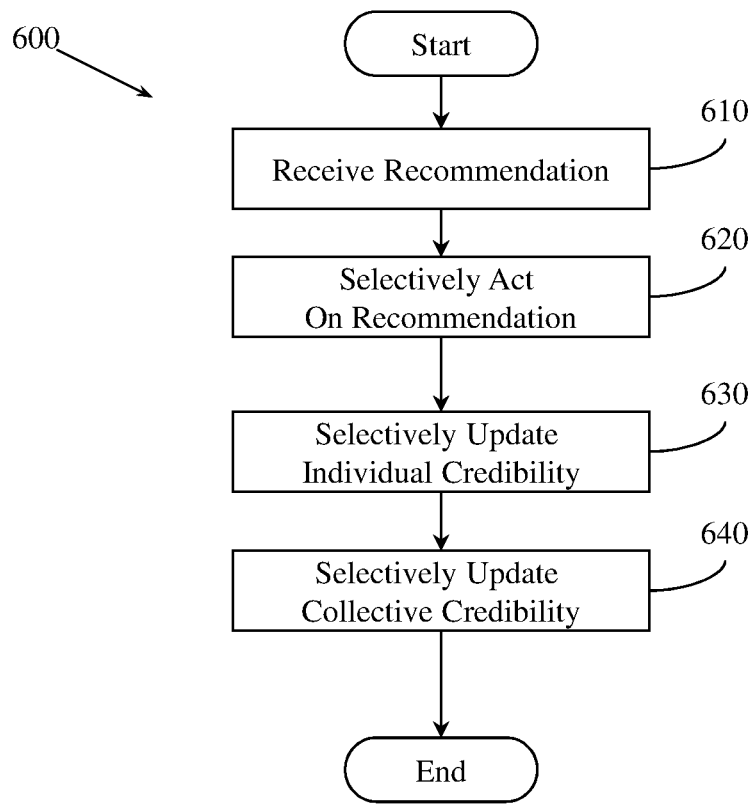
FIG. 6 illustrates an example method associated with adaptive storage management for optimizing a multi-tier data storage system.

FIG. 6 illustrates an example computerized method 600 associated with adaptive storage management for optimizing a multi-tier data storage system. Method 600 can only be performed in a computer because electronic voltages or other computer signals need to be generated to control electronic data storage devices. These electronic voltages or other computer signals cannot be generated by pen and paper or in the human mind. Method 600 includes, at 610, receiving a recommendation concerning whether or when to flush, evict, recall, or delete data in a collection of data storage devices that provide a multi-tier data store. The recommendation is received from a member of a set of recommendation providers. The recommendation providers are computer processes, computer firmware, or other computer circuits.

Method 600 also includes, at 620, selectively acting on the recommendation based on a credibility of the provider of the recommendation. Acting on the recommendation includes generating a computer signal (e.g., voltage on a control line) and providing that signal to an electronic data storage device that is controlled by such signals.

Method 600 also includes, at 630, selectively updating the credibility of the member of the set of recommendation providers based, at least in part, on how the recommendation affects an optimization parameter of the multi-tier data store. The optimization parameter may deal with utilization of a tier of storage (e.g., cache hit rate), performance of the system (e.g., response time for handling reads or writes), dollar cost, energy cost, or other parameters. The credibility of the individual member may be increased or decreased based on the positive or negative impact of its recommendation.

Method 600 also includes, at 640, selectively collectively updating the credibility of members of the set of recommendation providers based, at least in part, on a rebalancing parameter. The rebalancing parameter may determine when or how to update the credibility of the members. For example, credibility may be manipulated (e.g., cut in half) periodically, in response to a threshold number of transactions being performed, or at other times. Collectively updating the credibility of members of the set of recommendation providers facilitates keeping the credibility up-to-date with respect to recently made recommendations.

Figure 7:
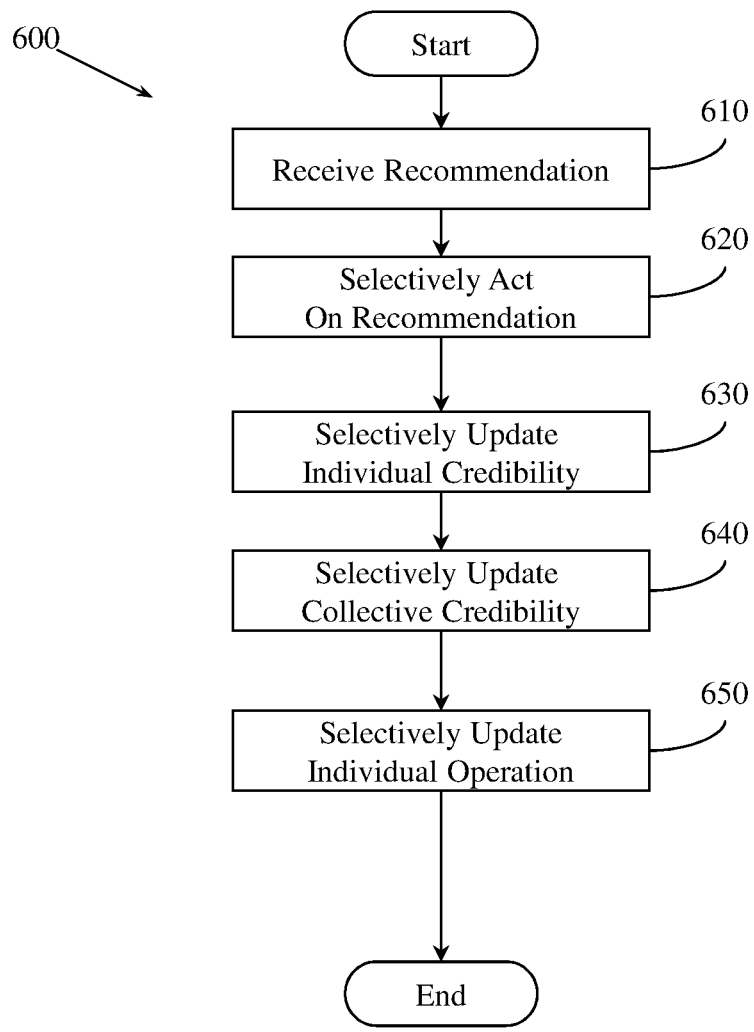
FIG. 7 illustrates an example method associated with adaptive storage management for optimizing a multi-tier data storage system.

FIG. 7 illustrates another embodiment of method 600. This embodiment also includes, at 650, selectively adapting the operation of the member of the set of recommendation providers. A member may notice that it is consistently correct when it makes certain recommendations but consistently incorrect when it makes other types of recommendations. Therefore, method 600 may, at 650, change the likelihood that the member will make a recommendation about a portion of a file system stored by the multi-tier data store, change the likelihood that the member will make a recommendation concerning a tier in the multi-tier data store, change the likelihood that the member will make a recommendation concerning a type of device in the multi-tier data store, or change the likelihood that the member will make a recommendation about flushing data, evicting data, recalling data, or deleting data from the multi-tier data store.

In one example, a method may be implemented as computer executable instructions. Thus, in one example, a computer-readable medium may store computer executable instructions that if executed by a machine (e.g., processor) cause the machine to perform method 600. While executable instructions associated with method 600 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, refers to computer hardware or firmware, and/or combinations of each to perform a function(s) or an action(s), and/or to cause a function or action from another logic, method, and/or system. Logic may include, for example, an instruction controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"User", as used herein, includes but is not limited to one or more persons, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable storage device storing instructions that, in response to execution, control a processor to perform operations, the operations comprising:
   receiving, from a member of a set of recommendation providers, a recommendation concerning whether or when to perform a storage management action on data stored in a collection of data storage devices that provide a multi-tier data store;
   selectively acting on the recommendation based on a credibility of the provider of the recommendation, where the credibility is based, at least in part, on a measure of a utility of a previous recommendation received from the provider;
   selectively updating the credibility of the member of the set of recommendation providers based, at least in part, on how the recommendation affects an optimization parameter of the multi-tier data store;

selectively updating the credibility of members of the set of recommendation providers based, at least in part, on a rebalancing parameter; and selectively adapting the operation of the member of the set of recommendation providers by changing a likelihood that the member will make a recommendation about a portion of a file system stored by the multi-tier data store, changing the likelihood that the member will make a recommendation concerning a tier in the multi-tier data store, changing the likelihood that the member will make a recommendation concerning a type of device in the multi-tier data store, or changing the likelihood that the member will make a recommendation about flushing data, evicting data, recalling data, or deleting data from the multi-tier data store.

2. The non-transitory computer-readable storage device of claim 1, where the storage management action is a flush operation, an evict operation, a recall operation, or a delete operation.

3. The non-transitory computer-readable storage device of claim 1, where the credibility is further based, at least in part, on a measure of a consistency, a value, a worth, or an efficacy of a previous recommendation received from the provider.

4. A non-transitory computer-readable storage device storing computer executable instructions that when executed by a computer control the computer to perform a method, the method comprising:

accessing a data storage transaction to be serviced by a device in a plurality of storage devices arranged in a multi-tier electronic data storage system, where the data storage transaction is a predicted transaction;

selectively providing information about the data storage transaction to one or more members of a plurality of data movement recommenders;

receiving, from a member of the plurality of data movement recommenders, a data movement recommendation, where the data movement recommendation is generated by a member of the plurality of data movement recommenders based on least recently used (LRU) reasoning, least frequently used (LFU) reasoning, large item eviction reasoning, small item eviction reasoning, space continuity reasoning, or weighted benefit analysis reasoning;

performing a data movement action for a member of the plurality of storage devices based, at least in part, on the data movement recommendation and a credibility of the member of the plurality of data movement recommenders associated with the data movement recommendation, where the credibility is based, at least in part, on a utility of a previous recommendation received from the recommender;

determining an impact of the data movement action on the multi-tier electronic data storage system;

storing data relating the data movement action, the impact of the data movement action, and the data movement recommendation;

selectively manipulating the credibility of the member of the plurality of data movement recommenders associated with the data movement recommendation based, at least in part, on the impact of the data movement action; and selectively collectively manipulating the credibility of members of the plurality of data movement recommenders based, at least in part, on determining a number of data movement actions performed for the member of the plurality of storage devices based on a data movement recommendation received from a member of the plurality of data movement recommenders, an amount of data moved for the member of the plurality of storage devices based on a data movement recommendation received from a member of the plurality of data movement recommenders, a time period, a cache hit rate for the multi-tier electronic data storage system falling below a threshold, or a response time for the multi-tier electronic data storage system exceeding a threshold, and further based on the cache hit rate for the multi-tier electronic data storage system and at least one of an actual size of the cache, or a derived size of the cache.

5. The non-transitory computer-readable storage device of claim 4, where the data movement action is an evict action, a flush action, a recall action, or a delete action.

6. The non-transitory computer-readable storage device of claim 4, where the credibility is further based, at least in part, on a measure of a consistency, a value, a worth, or an efficacy of a previous recommendation received from the recommender.

7. The non-transitory computer-readable storage device of claim 4, where the impact of the data movement action is a projected impact.

8. The non-transitory computer-readable storage device of claim 4, the method further comprising:

changing a criterion upon which the credibility of members of the plurality of data movement recommenders is selectively collectively manipulated based, at least in part, on a change in a cache hit rate for the multi-tier electronic data storage system, on a change in a response time for the multi-tier electronic data storage system, on a change in a dollar cost for operating the multi-tier electronic data storage system, or on a change in an energy cost for operating the multi-tier electronic data storage system.

9. The non-transitory computer-readable storage device of claim 4, where selectively manipulating the credibility of the member of the plurality of data movement recommenders is performed on a recommendation-by-recommendation basis, after a threshold number of data movement recommendations have been provided by the member of the plurality of data movement recommenders, or after a threshold period of time after the data movement action is performed.

10. An apparatus, comprising:
a processor;
a memory;
a set of circuits; and
a hardware interface that connects the processor, the memory, and the set of circuits;
the set of circuits comprising:
a first circuit configured to:
receive a data storage request to be handled by a multi-tier data storage system;
provide information about the data storage request to an advisor in a plurality of advisors;
receive a recommendation from the advisor concerning whether, when, or how to move data in the multi-tier data storage system in response to the data storage request;
selectively perform a data movement in the multi-tier data storage system based, at least in part, on the data storage request, the recommendation, and a weighting factor associated with the advisor;
log information about the data storage request, the recommendation from the advisor, and the data movement;

perform a retrospective analysis of a previous recommendation received from the advisor;
update a credibility of the advisor based, at least in part, on a utility of the previous recommendation received from the advisor;
a second circuit configured to:
selectively determine an effect of the data movement on an optimization measure of the multi-tier data storage system during an interval of interest;
a third circuit configured to:
selectively adapt the weighting factor for the advisor upon determining that an update threshold has been met; and
a fourth circuit configured to:
selectively adapt an operation of a selected advisor in the plurality of advisors upon determining that an adaptation threshold has been met.

11. The apparatus of claim 10, where the recommendation from the advisor is a flush recommendation, an evict recommendation, a recall recommendation, or a delete recommendation.

12. The apparatus of claim 10, where the credibility is further based at least in part on a measure of a consistency, a value, a worth, or an efficacy of the previous recommendation received from the advisor.

13. The apparatus of claim 10, where the second circuit is configured to selectively determine the effect of the data movement for less than each recommendation received from the plurality of advisors, and where the second circuit is configured to determine the interval of interest based on a time period, a point in time, a number of data movements performed, or an amount of data moved in the multi-tier data storage system.

14. The apparatus of claim 10, where the third circuit is configured to selectively adapt the weighting factor for the advisor as part of a collective action that manipulates the weighting factor for two or more advisors in the plurality of advisors; and
where the third circuit is configured to selectively adapt the weighting factor for the advisor based, at least in part, on the effect of the recommendation made by the advisor.

15. The apparatus of claim 10, where the fourth circuit is configured to adapt the operation of the selected advisor by changing the likelihood that the selected advisor will:
make a recommendation about a portion of a file system stored by the multi-tier data storage system,
make a recommendation concerning a tier in the multi-tier data storage system,
make a recommendation concerning a type of device in the multi-tier data storage system, or
make a recommendation about flushing data, evicting data, recalling data, or deleting data.

* * * * *